United States Patent
Prunean

(10) Patent No.: US 9,432,110 B2
(45) Date of Patent: Aug. 30, 2016

(54) SYSTEM AND METHOD FOR CODE MULTIPLEXING

(71) Applicant: The Boeing Corporation, Irvine, CA (US)

(72) Inventor: Cornel Prunean, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 22 days.

(21) Appl. No.: 14/271,670

(22) Filed: May 7, 2014

(65) Prior Publication Data

US 2015/0326303 A1    Nov. 12, 2015

(51) Int. Cl.
*H04B 7/185*    (2006.01)
*H04H 40/90*    (2008.01)
*G01S 19/02*    (2010.01)
*H04J 13/00*    (2011.01)

(52) U.S. Cl.
CPC ........... *H04B 7/18523* (2013.01); *G01S 19/02* (2013.01); *H04H 40/90* (2013.01); *H04J 13/0003* (2013.01); *H04B 2201/70716* (2013.01)

(58) Field of Classification Search
CPC .................................................. H04L 5/0048
USPC ....... 370/335, 342, 487, 229, 204, 203, 206; 375/261, 473
See application file for complete search history.

(56) References Cited

U.S. PATENT DOCUMENTS

| | | | |
|---|---|---|---|
| 5,771,461 A * | 6/1998 | Love et al. | 455/522 |
| 6,430,213 B1 * | 8/2002 | Dafesh | 375/146 |
| 7,120,198 B1 * | 10/2006 | Dafesh et al. | 375/261 |
| 7,791,534 B1 * | 9/2010 | Zhi et al. | 342/357.22 |
| 8,111,735 B2 * | 2/2012 | Chen | 375/150 |
| 8,976,891 B2 * | 3/2015 | Pratt et al. | 375/295 |
| 2001/0027090 A1 * | 10/2001 | Uesugi | 455/126 |
| 2010/0034313 A1 * | 2/2010 | Benavides | 375/268 |
| 2011/0044398 A1 * | 2/2011 | Dowling et al. | 375/286 |
| 2011/0051783 A1 | 3/2011 | Cahn et al. | |
| 2013/0208767 A1 * | 8/2013 | Prunean | 375/150 |
| 2013/0293421 A1 * | 11/2013 | Bartone | 342/386 |
| 2014/0104103 A1 * | 4/2014 | Enge et al. | 342/357.64 |

OTHER PUBLICATIONS

European Patent Office, European Application No. 15166748.2, Extended European Search Report dated Sep. 4, 2015, 8 pages.

Zhou et al., "CS-Pocet: A Dual-frequency Constant Envelope Multiplex Method for GNSS Signal," Proceedings of 2014 International Technical Meeting of the Institute of Navagation, Jan. 29, 2014, pp. 835-843.

Zhang et al, "Implementation of Constant Envelope Multiplexing Based on Extended Interplex and Inter-Modulation Construction Method," Proceedings of the 25th International Technical Meeting of the Satellite Division of the Institute of Navigation, Sep. 21, 2012, abstract, 4 pages.

* cited by examiner

*Primary Examiner* — Andrew Lai
*Assistant Examiner* — Andrew C Lee
(74) *Attorney, Agent, or Firm* — Patterson + Sheridan, LLP

(57) ABSTRACT

A system and method include a modulator to combine satellite codes with a carrier signal on an I-Channel and a Q-Channel. A processor applies a code power fraction to the combined codes on the I-Channel and the Q-Channel to provide a unity amplitude while maintaining a phase angle so that a signal constant envelope transmission can occur without a balancing code.

20 Claims, 6 Drawing Sheets

| k | M | C/A | P | L1cP | L1cd | CAOCET I' | Q' |
|---|---|---|---|---|---|---|---|
| 1 | 1 | 1 | 1 | 1 | 1 | 0.78 | 0.63 |
| 2 | 1 | 1 | 1 | 1 | -1 | 0.93 | 0.37 |
| 3 | 1 | 1 | 1 | -1 | 1 | 1.00 | 0.09 |
| 4 | 1 | 1 | 1 | -1 | -1 | 0.95 | -0.30 |
| 5 | 1 | 1 | -1 | 1 | 1 | 0.95 | 0.30 |
| 6 | 1 | 1 | -1 | 1 | -1 | 1.00 | -0.09 |
| 7 | 1 | 1 | -1 | -1 | 1 | 0.93 | -0.37 |
| 8 | 1 | 1 | -1 | -1 | -1 | 0.78 | -0.63 |
| 9 | 1 | -1 | 1 | 1 | 1 | 0.35 | 0.94 |
| 10 | 1 | -1 | 1 | 1 | -1 | 0.61 | 0.79 |
| 11 | 1 | -1 | 1 | -1 | 1 | 0.96 | 0.30 |
| 12 | 1 | -1 | 1 | -1 | -1 | 0.69 | -0.72 |
| 13 | 1 | -1 | -1 | 1 | 1 | 0.96 | 0.72 |
| 14 | 1 | -1 | -1 | 1 | -1 | 0.96 | -0.30 |
| 15 | 1 | -1 | -1 | -1 | -1 | 0.61 | -0.79 |
| 16 | 1 | -1 | -1 | -1 | -1 | 0.35 | -0.94 |
| 17 | -1 | 1 | 1 | 1 | 1 | -0.35 | 0.94 |
| 18 | -1 | 1 | 1 | 1 | -1 | -0.61 | 0.79 |
| 19 | -1 | 1 | 1 | -1 | 1 | -0.96 | 0.30 |
| 20 | -1 | 1 | 1 | -1 | -1 | -0.69 | -0.72 |
| 21 | -1 | 1 | -1 | 1 | 1 | -0.69 | 0.72 |
| 22 | -1 | 1 | -1 | 1 | -1 | -0.96 | -0.30 |
| 23 | -1 | 1 | -1 | -1 | 1 | -0.61 | -0.79 |
| 24 | -1 | 1 | -1 | -1 | -1 | -0.35 | -0.94 |
| 25 | -1 | -1 | 1 | 1 | 1 | -0.78 | 0.63 |
| 26 | -1 | -1 | 1 | 1 | -1 | -0.93 | 0.37 |
| 27 | -1 | -1 | 1 | -1 | 1 | -1.00 | 0.09 |
| 28 | -1 | -1 | 1 | -1 | -1 | -0.95 | -0.30 |
| 29 | -1 | -1 | -1 | 1 | 1 | -0.95 | 0.30 |
| 30 | -1 | -1 | -1 | 1 | -1 | -1.00 | -0.09 |
| 31 | -1 | -1 | -1 | -1 | 1 | -0.93 | -0.37 |
| 32 | -1 | -1 | -1 | -1 | -1 | -0.78 | -0.63 |

Figure 3

SYSTEM AND METHOD FOR CODE MULTIPLEXING

FIELD

A system and method relate to code multiplexing, and the system and method can provide for a channel amplitude optimized constant envelope transmission for satellite based code multiplexing.

BACKGROUND

The Global Positioning System (GPS) is a satellite-based navigation system made up of a network of satellites in orbit. GPS satellites circle the earth in a precise orbit and transmit signal information to earth. GPS receivers take the signal information and use triangulation to calculate the receiver's location. The GPS receiver can compare the time a signal was transmitted by a satellite with the time it was received. The time difference tells the GPS receiver how far away the satellite is. With distance measured from several satellites, the receiver can determine the receiver's position and display it. Once the receiver's position has been determined, a GPS device can calculate other information, such as speed, bearing, track, trip distance, distance to destination, sunrise and sunset time and more.

SUMMARY

The systems and methods can provide for a channel amplitude optimized constant envelope transmission for GPS code multiplexing, without the need for a ternary adjustment (T/A) or other balancing code. For example, the GPSII L1-band is a single carrier with a complex interplex quadrature phase shift keying (QPSK) modulation that would otherwise utilize a balancing T/A code to accommodate a signal constant envelope. Without the T/A code power can be saved. Moreover, with the addition of the new L1C codes to the GPS III signal, to optimally combine the codes while maintaining a constant envelope transmission the interplex method with the addition of the majority vote scheme can be used. This can require the balancing T/A code in order to accommodate for a constant envelope signal transmission. However, by utilizing the channel amplitude optimized constant envelope transmission for GPSIII code multiplexing, e.g., systems and methods described herein, the need for the majority vote scheme and T/A code can be removed and therefore power saved.

One embodiment includes a GPS or satellite multiple code combining method using the CAOCET (Channel-Amplitude-Optimized Constant Envelope Transmission). The CAOCET method assigns an optimized code power fraction to each QPSK modulated GPS channels while maintaining a constant envelope transmission. Conventional GPS interplex code combining methods enable the L1 Transmitter to operate in compression gain region without signal. Unlike conventional methods, embodiments of the present invention use the CAOCET method to eliminate the need for the T/A code used currently to balance the GPS signals in order to maintain a constant envelope transmission. This method solves a problem by adding a new code (T/A, ternary adjustment code) in order to accommodate a constant envelope transmission.

BRIEF DESCRIPTION OF THE DRAWINGS

In association with the following detailed description, reference is made to the accompanying drawings, where like numerals in different figures can refer to the same element.

FIG. 3 is a block diagram of exemplary lookup table to use the channel amplitude optimized constant envelope transmission.

DETAILED DESCRIPTION

Systems and methods provide for code multiplexing, e.g., for GPS or other satellites, using a channel amplitude optimized constant envelope transmission. Codes can be transmitted for detection at GPS monitoring stations that maintain GPS constellations, and also by GPS users, etc. The systems and methods can provide a constant envelope code without need for the ternary adjustment (T/A) or other adjustment code and therefore eliminate a need for power to be allocated to the T/A code. Eliminating the T/A code can allow for a reduction in the transmitter direct current (DC) power consumption and/or allow for an increase in the transmitter radio frequency (RF) output signal power, e.g., used for other codes. The systems and methods as described for GPS is for exemplary purposes, and systems and methods can be used with other communication systems, e.g. other satellite-based navigation systems in addition to GPS systems.

Figure 1:
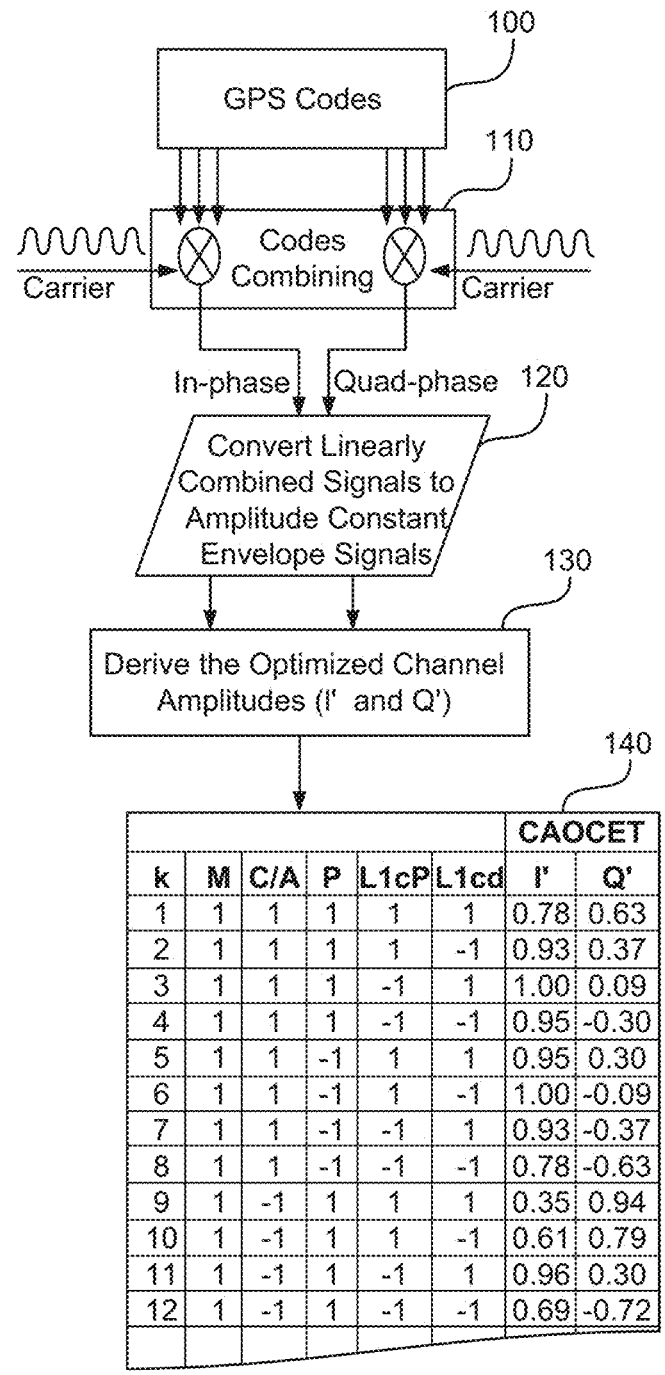
FIG. 1 is a block diagram of an exemplary system and method for optimized channel amplitude multiplexing for GPS codes.

FIG. 1 is a block diagram of an exemplary system and method for optimized channel amplitude multiplexing, e.g., for GPS codes. GPS codes are sent using L-band carrier signals as combined in the in-phase channel (I-channel) and quad-phase channel (Q-channel) (100). Exemplary carrier frequencies include L1 (1575.42 megahertz MHz), L2 (1227.60 MHz), L3 (1381.05 MHz), and L5 (1176.45 MHz). Multiple codes can be transmitted on the I-channel and multiple codes can be transmitted on the Q-channel, with different spreading codes. Exemplary codes include the coarse/acquisition (C/A) code, the precision (P) code, the encrypted P-code (P(Y)-code), military (M) code, L1 Cp (pilot code), L1Cd (data code), etc. For example, the C/A code is a 1,023 bit deterministic sequence called pseudo-random noise or pseudorandom binary sequence (PN or PRN) which, when transmitted at 1.023 megabits per second (Mbit/s), repeats every millisecond. The sequences match up or strongly correlate when they are aligned. Each satellite can transmit a unique PRN code, which does not correlate well with other satellites' PRN codes. The PRN codes are highly orthogonal to one another which allows the receiver to recognize multiple satellites on the same frequency.

To eliminate the T/A code, a hardware (Navigation Data Processor, NDP) can implement the codes combining, channel assignments and the channel amplitude based on a lookup table. The NDP modulators perform linear code combining of the binary signals and channel selection (110). A logic, e.g., algorithm stored in memory and executed by a processor, can convert the linearly combined signals to an amplitude optimized constant envelope (120). The algorithm can include hardware, software, firmware and/or a combination hardware, software and firmware. The constellation points of the I-channel and Q-channel signals are projected on a unit circle resulting in a unity amplitude while maintaining a phase angle of each constellation point. The projection can include a vector projection onto a plane. The constellation point states projected on the unit circle (see, e.g., FIG. 2) can be reduced to a Cartesian value (x,y) which become the amplitude of I-channel(x) and the amplitude of Q-channel (y). Since the states as positioned on a unitary circle provide a constant envelope no T/A or other special power consuming code needs to be used.

The logic can optimize the states to provide adequate, e.g., non-overlapping, state space separation between constellation points. For example, a phase error allowed by GPS can be applied to one or more states to provide spacing between the states on the unit circle. Therefore, for each set of combined binary codes there is an assigned I-channel and Q-channel amplitude (130). A lookup-table (see e.g., FIG. 3) or other storage and search mechanism can be used to store the permutations of binary codes with their associated channel amplitude optimized for a constant envelope transmission (140). The lookup table can include an array or matrix of data that contains items that are searched. The lookup table can be arranged as key-value pairs, where the keys are the data items being searched and the values are either the actual data or pointers to where the data are located.

Figure 2:
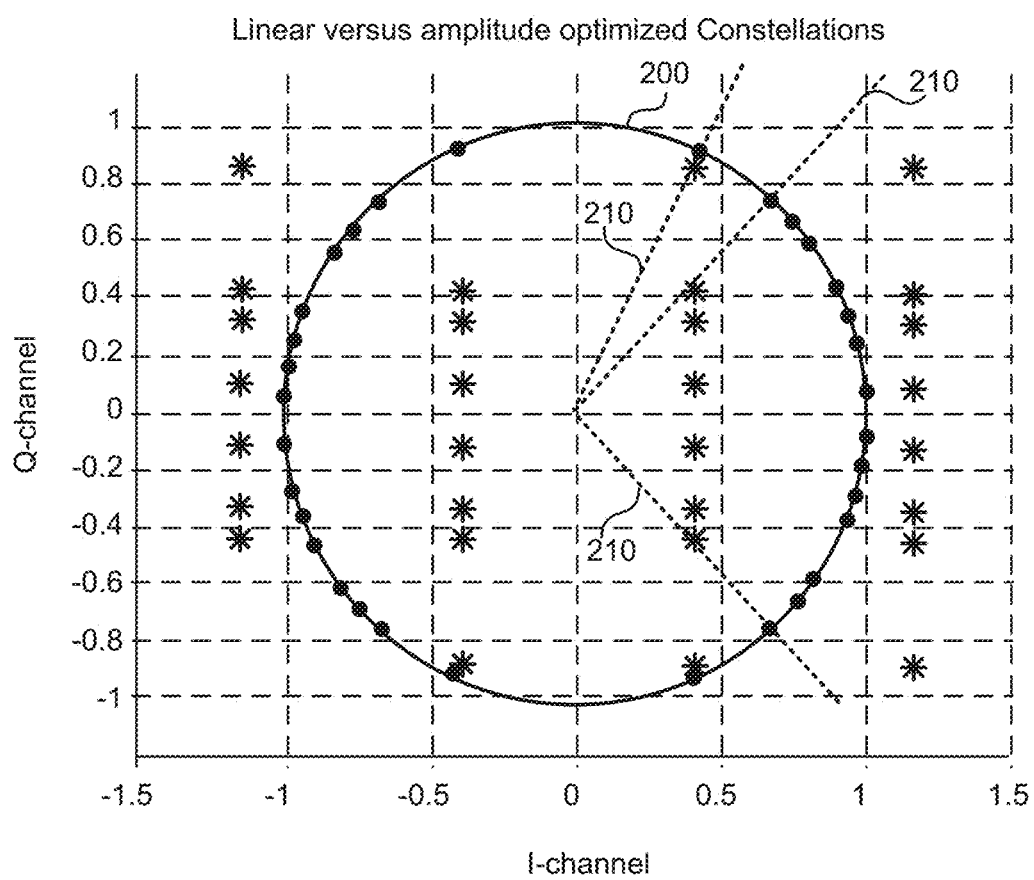
FIG. 2 is a graph of an exemplary linear versus amplitude optimized constellation states for the I-channel and Q-channel.

FIG. 2 is a graph of exemplary linear versus amplitude optimized constellation states for the I-channel and Q-channel. For purposes of explanation, the GPS signal is a quadrature phase shift keying (QPSK) signal with two orthogonal channels identified as the I-channel and the Q-channel. For GPS the codes can be selected and combined per an assigned I-channel or a Q-channel. To each code is ascribed a code power fraction derived from code power requirements. One option of combining the codes is PXX, where P-code is combined with L1Cp and L1Cd codes as:

$$I = M + C/A, \text{ and}$$

$$Q = P + L1Cp + L1Cd.$$

The linear combining of the codes results in an M-ary constellation resulting in a unique constellation of $2^n$ states (where n is the number of codes). For the case described above having five codes, M, C/A, P, L1Cp, L1Cd there are 2^5 or 32 total states possible. Other amounts of codes can be used. The linear constellation points (shown as x's) are then projected on the unit circle 200, resulting in a unit circle constellation points (shown as o's) of a unity amplitude while maintaining the phase angle (e.g., angles 210) of each constellation point. In this implementation only the amplitude of each point changes. The constellation states projected on the unit circle can be described as Cartesian values (x,y) which become the amplitude of I-channel (x) and the amplitude of Q-channel (y), exemplary values of which are shown in the lookup FIG. 3. Instead of assigning the code power fraction to each code prior to code combining, the codes can be combined and then the optimized code power fraction is applied to each channel.

FIG. 3 is a block diagram of an exemplary lookup table to use the channel amplitude optimized constant envelope transmission without the need for a T/A code. The constant envelope enables the transmitter to operate in the amplifier's compression gain region without signal distortion. The possible states k for the codes M, C/A, P, L1 Cp, L1Cd can be included in the lookup table. An algorithm can determine the I-channel and Q-channel position for each state k from the lookup table. For example, when the algorithm receives a stream of data bits M=1, C/A=1, P=1, L1Cp=1, L1Cd=1, the corresponding value can be determined for the I-channel as 0.78 and the Q-channel as 0.63. The transmitter therefore drives the I-Channel amplitude to 0.78 and drives the Q-Channel amplitude to 0.063. This is repeated for all the stream of data bits. Therefore, the binary channels amplitude are being driven and the power is not being used for a balancing T/A code. Additionally or alternatively, in other implementations a balancing code including a T/A code can also be used.

The lookup table can be customized for various code power requirements, e.g., more power to the P code and less power to the C/A code. The lookup tables can be configured by ground control and sent to the satellites and/or the satellites can have a library of different tables. For the present lookup tables, when the state data is received by a satellite, e.g., line 16 as M=1, C/A=−1, P=−1, L1Cp=−1, L1Cd=−1, the amplifier of the transmitter drives the I-Channel to 0.35 and the Q-Channel to −0.94, which can then be filtered and radiated via an antenna to the receivers on the ground. By using the channel amplitude optimized constant envelope transmission, the T/A code is unnecessary and can be eliminated.

Figure 4:
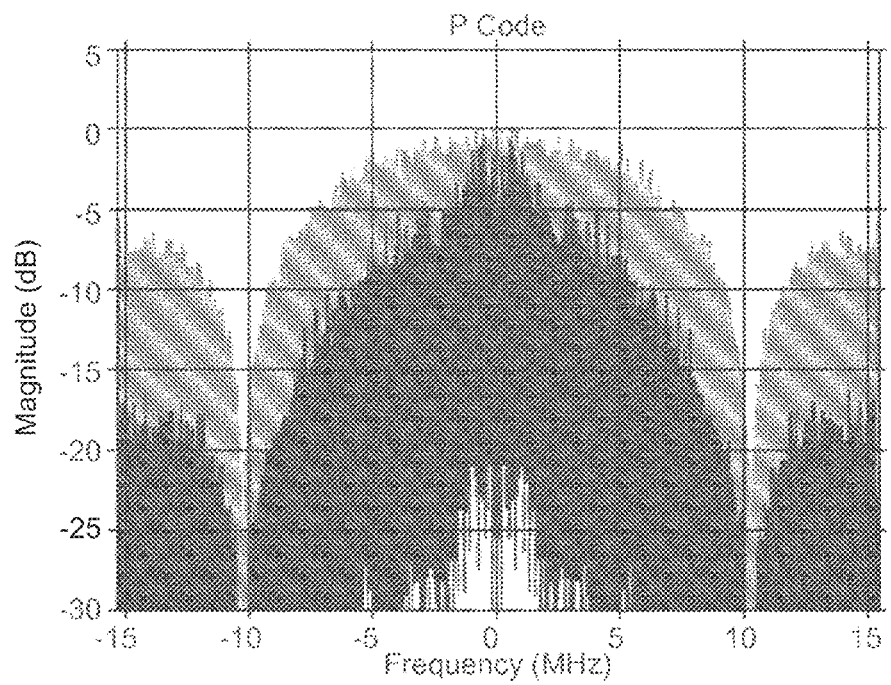
FIG. 4 is a graph of an exemplary frequency response for the P-code.

FIG. 4 is a graph of an exemplary frequency response for the P-code. The top signal represents the baseband signal level for the P-code. The bottom signal represents the P-code after being filtered and combined with the carrier signal according the systems and methods described herein. The bottom signal maintains the shape of the top signal and is therefore a good representation of the top signal.

Figure 5:
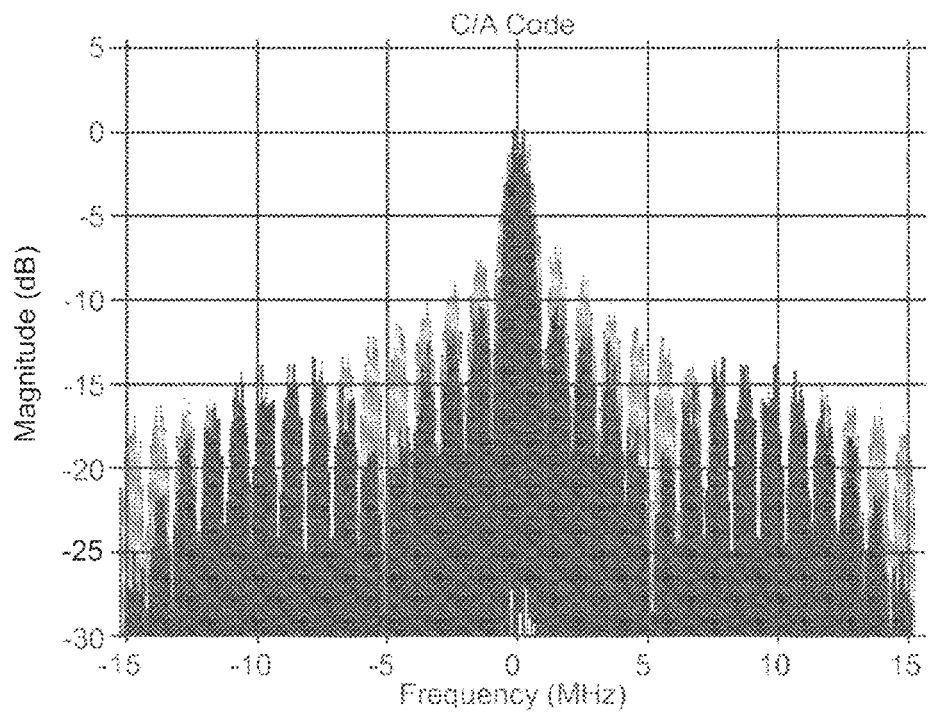
FIG. 5 is a graph of an exemplary frequency response for the C/A-code.

FIG. 5 is a graph of an exemplary frequency response for the C/A-code. The top signal represents the baseband signal level for the C/A-code. The bottom signal represents the C/A-code after being filtered and combined with the carrier signal according the systems and methods described herein. The bottom signal maintains the shape of the top signal and is therefore a good representation of the top signal.

Figure 6:
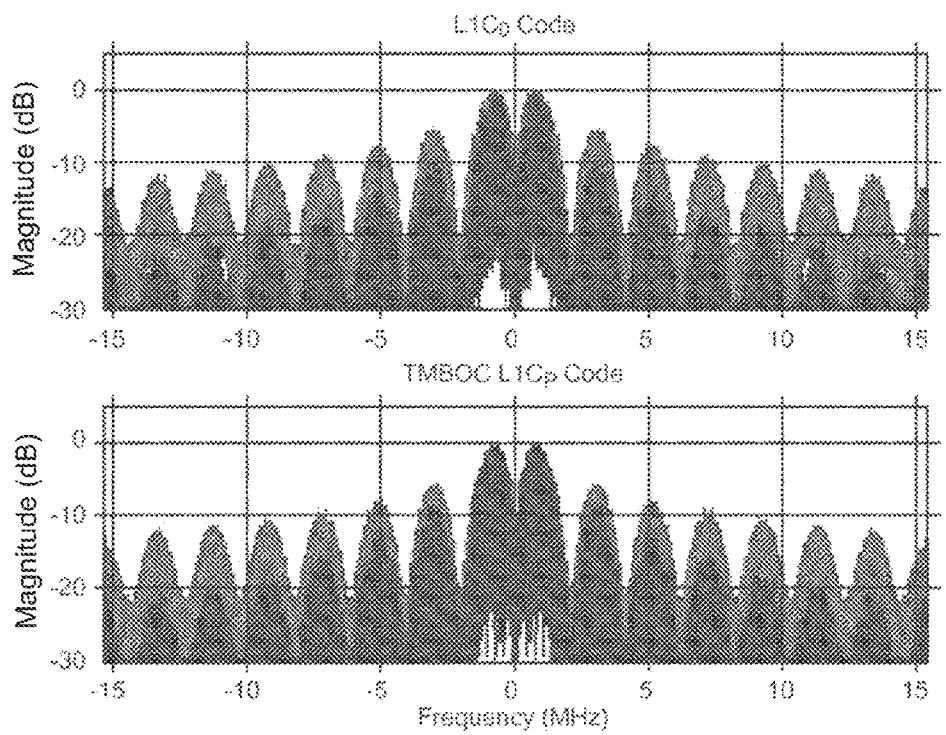
FIG. 6 is a graph of an exemplary frequency response for the L1Cd and L1Cp-codes.

FIG. 6 is a graph of an exemplary frequency response for the L1Cd and L1 Cp-codes. The top signal represents the baseband signal level for the L1Cd and L1 Cp-codes. The bottom signal represents the L1Cd and L1 Cp-codes after being filtered and combined with the carrier signal according the systems and methods described herein. The bottom signal maintains the shape of the top signal and is therefore a good representation of the top signal.

Figure 7:
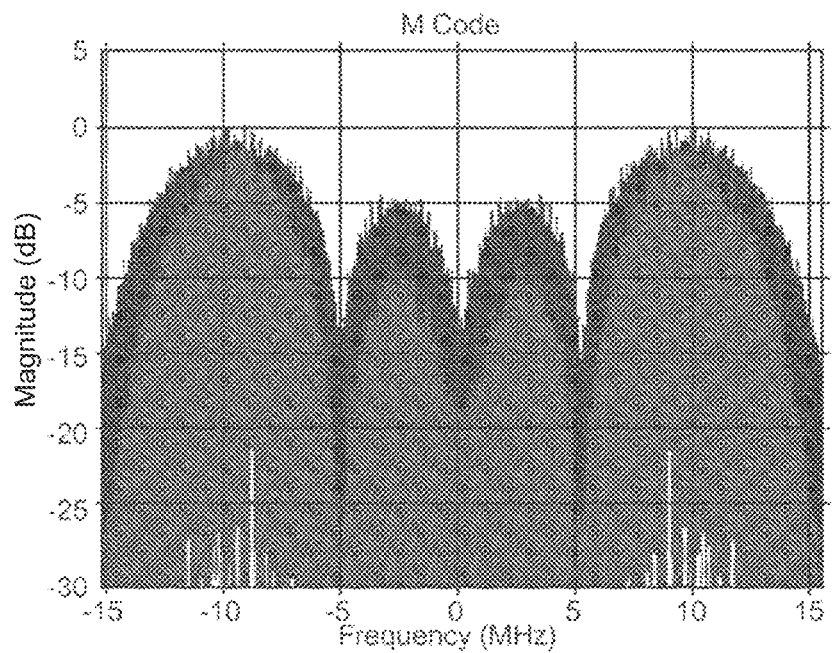
FIG. 7 is a graph of an exemplary frequency response for the M-code.

FIG. 7 is a graph of an exemplary frequency response for the M-code. The top signal represents the baseband signal level for the M-code. The bottom signal represents the M-code after being filtered and combined with the carrier signal according the systems and methods described herein. The bottom signal maintains the shape of the top signal and is therefore a good representation of the top signal.

Figure 8:
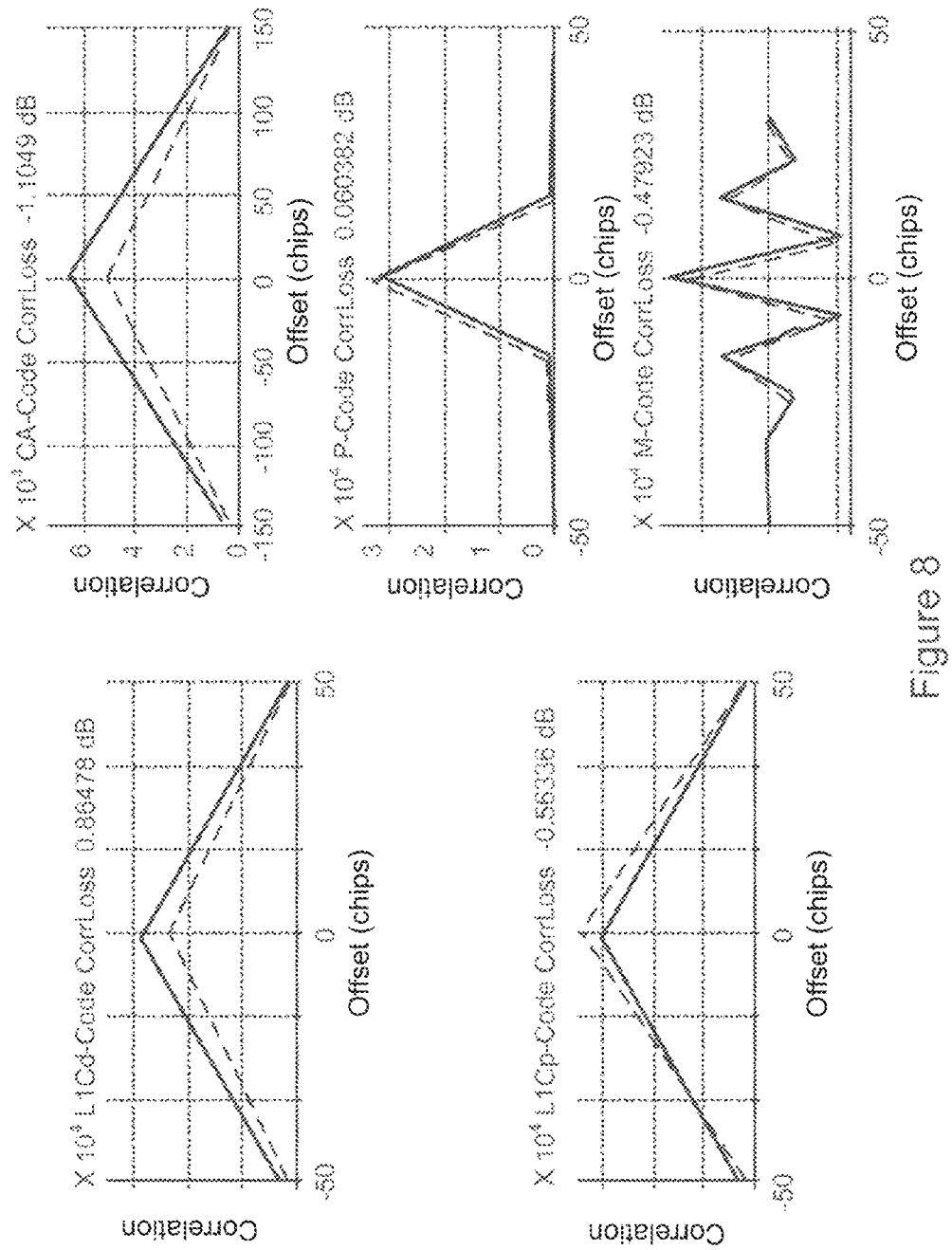
FIG. 8 is a graph of exemplary correlation losses for filtered C/A, P, M, L1Cd and L1Cd codes.

FIG. 8 is a graph of exemplary correlation losses for filtered C/A, P, M, L1Cd and L1Cd codes. The graphs show an acceptable level of correlation loss for the channel amplitude constant envelope transmission filtered codes after optimization. The received signal highly resembles the generated signal.

The systems, methods and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Many modifications and other embodiments set forth herein will come to mind to one skilled in the art having the benefit of the teachings presented in the foregoing descriptions and the associated drawings. Although specific terms are employed herein, they are used in a generic and descriptive sense only and not for purposes of limitation.

The invention claimed is:

1. A system, comprising:
 a modulator configured to:
  modulate, on an in-phase channel (I-channel), a first portion of data using a first combination of two or more satellite codes of a plurality of satellite codes,
  modulate, on a quadrature-phase channel (Q-channel), a second portion of the data using a second combination of two or more satellite codes of the plurality of satellite codes, and
  combine each of the modulated first and second portions of the data with a respective carrier signal to produce an in-phase signal component and a quadrature-phase signal component; and
 a processor coupled with the modulator and configured to apply a code power fraction to the produced in-phase and quadrature-phase signal components.

2. The system of claim 1, where the code power fraction comprises an assigned I-channel amplitude and an assigned Q-channel amplitude.

3. The system of claim 2, wherein the processor is further configured to access a lookup table storing the assigned I-channel amplitude and the assigned Q-channel amplitude.

4. The system of claim 1, further comprising an antenna coupled with the processor and configured to:
 transmit the in-phase signal component and the quadrature-phase signal components with the applied code power fraction as a constant-envelope signal.

5. The system of claim 4, wherein the transmission of the constant-envelope signal occurs without applying a balancing code.

6. The system of claim 1, wherein the processor is further configured to apply a balancing code comprising a ternary adjustment (T/A) code.

7. The system of claim 5, wherein transmission of the constant-envelope signal consumes a reduced amount of direct current (DC) power, when compared with an amount of DC power required for transmission using an applied balancing code.

8. The system of claim 5, wherein a radio frequency (RF) output code power is increased due to transmission of the constant-envelope signal without applying a balancing code.

9. The system of claim 1, where the in-phase signal component and the quadrature-phase signal component with the applied code power fraction produce a unity amplitude signal while maintaining a phase angle of a constellation of possible states of the plurality of satellite codes.

10. The system of claim 1, where the first combination of two or more satellite codes comprises a military (M) code and a coarse acquisition (C/A) code, and the second combination of two or more satellite codes comprises a precision (P) code, a pilot (L1Cp) code, and a data (L1Cd) code.

11. A method for transmitting a plurality of satellite codes from a radio frequency (RF) transmitter of a satellite, the method comprising:
 combining, on a first modulated channel and a second modulated channel of a plurality of modulated channels, a combination of two or more satellite codes of the plurality of satellite codes, the first modulated channel and the second modulated channel respectively comprising an in-phase channel (I-channel) and a quadrature-phase channel (Q-channel); and
 applying, using a processor of the RF transmitter, a code power fraction to the first modulated channel and the second modulated channel of the plurality of modulated channels to thereby produce a constant-envelope signal for transmission,
 wherein the code power fraction comprises a first amplitude corresponding to the first modulated channel and a second amplitude corresponding to the second modulated channel.

12. The method of claim 11, further comprising transmitting the constant-envelope signal without applying a balancing code.

13. The method of claim 11, further comprising applying a balancing code comprising a ternary adjustment (T/A) code.

14. The method of claim 11, wherein the plurality of modulated channels comprise Global Positioning System (GPS) satellite channels.

15. The method of claim 11, wherein the modulated channels are quadrature phase shift keying (QPSK) modulated.

16. The method of claim 11, wherein the code power fraction comprises channel amplitudes assigned to each of the plurality of modulated channels.

17. The method of claim 16, where the assigned channel amplitudes are selected such that states of the modulated channels do not overlap.

18. A method of communication using a satellite, the method comprising:

combining, on each of an in-phase channel (I-channel) and a quadrature-phase channel (Q-channel), a respective combination of two or more satellite codes selected from a plurality of satellite codes with a carrier signal to produce an in-phase signal component and a quadrature-phase signal component;

applying a code power fraction to the produced in-phase and quadrature-phase signal components, the code power fraction comprising an assigned I-channel amplitude and an assigned Q-channel amplitude; and transmitting, using a radio frequency (RF) transmitter of the satellite, the in-phase signal component and the quadrature-phase signal component with the applied code power fraction as a constant-envelope signal without applying a balancing code.

19. The method of claim 18, where the in-phase signal component and the quadrature-phase signal component with the applied code power fraction produce a unity amplitude signal while maintaining a phase angle of a constellation of possible states of the plurality of satellite codes.

20. The method of claim 18, where the combination of two or more satellite codes carried on the I-channel comprises a military (M) code and a coarse acquisition (C/A) code, and the combination of two or more satellite codes carried on the Q-channel comprises a precision (P) code, a pilot (L1Cp) code, and a data (L1Cd) code.

* * * * *